US008302453B2

(12) United States Patent
Pedersen

(10) Patent No.: US 8,302,453 B2
(45) Date of Patent: Nov. 6, 2012

(54) APPARATUS AND METHOD FOR ATTACHING EDGING TO A SHEET

(75) Inventor: Tomas Pedersen, Støvring (DK)

(73) Assignee: TP Holding Hadsund ApS, Hadsund (DK)

( * ) Notice: Subject to any disclaimer, the term of this patent is extended or adjusted under 35 U.S.C. 154(b) by 357 days.

(21) Appl. No.: 12/731,914

(22) Filed: Mar. 25, 2010

(65) Prior Publication Data

US 2010/0263429 A1 Oct. 21, 2010

Related U.S. Application Data

(63) Continuation of application No. PCT/DK2008/000301, filed on Aug. 25, 2008.

(30) Foreign Application Priority Data

Oct. 4, 2007 (DK) ................................ 2007 01430

(51) Int. Cl.

| | |
|---|---|
| ***B21D 25/00*** | (2006.01) |
| ***B23P 11/00*** | (2006.01) |
| *B21D 26/02* | (2011.01) |
| *B21D 39/08* | (2006.01) |
| *B21J 13/08* | (2006.01) |
| *B21C 1/00* | (2006.01) |

(52) U.S. Cl. ................ 72/466.7; 72/57; 72/457; 72/705

(58) Field of Classification Search ................. 72/466.7, 72/57, 60, 63, 457, 705, 453.01, 453.13; 29/421.1

See application file for complete search history.

(56) References Cited

U.S. PATENT DOCUMENTS 4,732,033 A * 3/1988 Smedberg et al. ......... 72/453.13
5,487,332 A * 1/1996 Handke ......................... 100/321
6,042,319 A 3/2000 Hoffman

FOREIGN PATENT DOCUMENTS

WO WO03084763 A2 10/2003

OTHER PUBLICATIONS

International Search Report Nov. 11, 2008, PCT/DK2008/000301.*
International Search Report, Nov. 11, 2008, PCT/DK2008/000301.

* cited by examiner

*Primary Examiner* — Edward Tolan
*Assistant Examiner* — Lawrence J Averick
(74) *Attorney, Agent, or Firm* — William J. Sapone; Coleman Sudol Sapone P.C.

(57) ABSTRACT

An apparatus for attaching edging to a sheet has two stationary guides at each end, an upper hollow guide (8), a pair of lower guides (5), with a fixed base (4) between the lower guides. A hollow profile (1) is vertically movable, having a binding rail (2) on the underside thereof. The upper guide (8) is placed inside the profile, forming upper and lower spaces (7, 9) between the profile and the upper guide. Upper and lower flexible elements (10, 11) are provided in each space. In use, one element is filled while the other element is emptied, such that when an edging and a sheet is placed between the fixed base (4) and the binding rail, the lower element is filled to force the profile and thus the binding rail down to attach the edging. Then the upper element is filled to release the sheet with the attached edging.

15 Claims, 3 Drawing Sheets

APPARATUS AND METHOD FOR ATTACHING EDGING TO A SHEET

CROSS REFERENCE TO RELATED APPLICATIONS

This application is a continuation of PCT International application no. PCT/DK2008/000301, filed Aug. 25, 2008, claiming priority in Danish patent application no. PA 2007 01430.

BACKGROUND

The invention relates to a device for pressing of items such as a metallic rail around the edge of a sheet.

The invention furthermore relates to a method for pressing of items such as a metallic rail around the edge of a sheet.

The invention also relates to the application of a device for pressing of items such as a metallic rail around the edge of a sheet.

It is known to press items such as folded sheet metal rails, which are to be pressed around e.g. posters in order to reinforce and strengthen the edge used for hanging of the posters.

The devices, which have hitherto been used for pressing, are primarily based on mechanical closing of metallic cheeks, which are arranged around an axis of rotation according to construction principles, which are also known from various plate bending machines.

It has been found, however, that there are some drawbacks of the hitherto known devices, including that it is difficult to transfer an even pressure on the item, which is to be pressed, and it has also been shown to be problematic to secure the item in a specific position during the pressing process.

THE OBJECT OF THE INVENTION

It is therefore an object of the invention to improve the known device and the method.

The object of the invention is achieved by a device which is characterized in that the device includes a profile, on which a binding rail is mounted on the underside of the profile, where the profile and the binding rail can be moved up and down in relation to two stationary mechanical guides, which are mounted to each other. One stationary mechanical guide is placed in the profile such that the stationary mechanical guide has a lower exterior side, which faces a lower internal side of the profile and similarly an upper external side, which faces an upper internal side of the profile. Thereby two spaces are created between the external sides of the guide and the internal sides of the profile, an upper space and a lower space. In each of these spaces there is placed at least one flexible element, which can in turns be filled or emptied with a gas or a liquid. On the other stationary mechanical guide is mounted a fixed base, which runs parallel with and under the binding rail.

In this way it thus becomes possible to transfer an even pressure to the item, which is to be pressed.

It is also characteristic of the invention that the device is provided with one or more magnets mounted at or integrated in the base, for fastening of iron-containing items, which are to be pressed.

It is hereby achieved that the item can be fixed in a specific position during the pressing process.

Further preferred embodiments of the device are discussed below.

As mentioned the invention also relates to a method.

This method is characterized in that a device is used for the pressing, where a partially bended metal profile rail is put on the fixed base, while an upper space flexible element is extended and a lower space flexible element is emptied. A sheet is placed with its edge into the partially pressed metallic rail. Hereafter the upper space flexible element is emptied while the lower space flexible element is extended. Thereby the lower space flexible element presses against the stationary mechanical guide's lower side and the movable profile's lower internal side and creates a descending movement of the movable profile and the binding rail against the fixed base such that the metallic rail is pressed wholly together around the edge of the sheet. Hereafter the lower space flexible element is again emptied and the upper space flexible element is filled, whereby the profile with the pressing machine is again lifted up in relation to the stationary mechanical guides and now releases the pressed item.

Hereby, it thus becomes possible, simple, inexpensive and efficient to transfer an even pressure over the whole item surface, which is to be pressed.

Further preferred embodiments are discussed below.

The invention as mentioned also relates to the application, which is characterized in that the device is used for pressing together or pressing items such as rails including metallic and magnetic rails around an end surface of objects such as posters or pictures.

BRIEF DESCRIPTION OF THE DRAWINGS

The invention will now be explained more fully with reference to the drawings, in which.

DETAILED DESCRIPTION OF THE INVENTION

Figure 1:
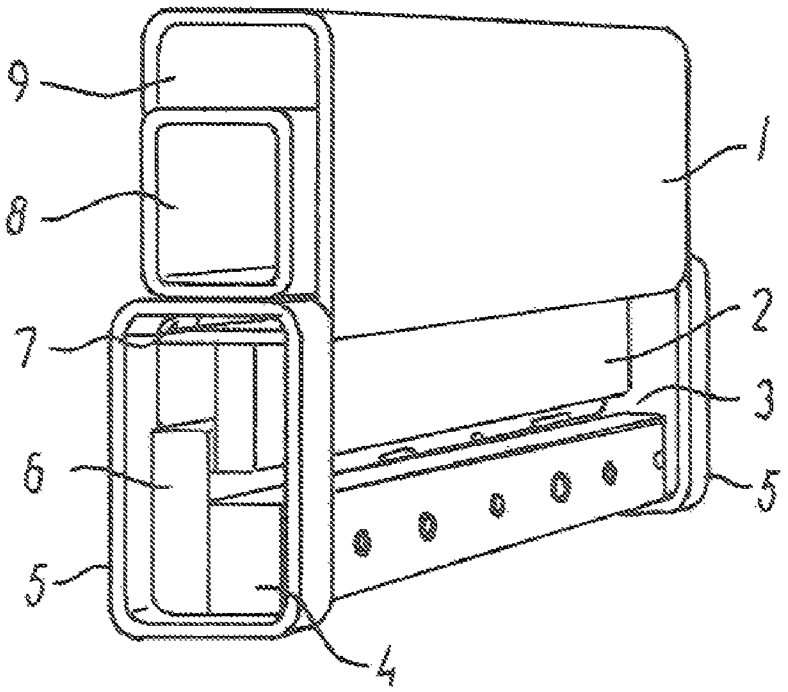
FIG. 1 shows a device for pressing of items with deactivated pressing mechanism.

In FIG. 1 is shown a device for pressing of items such as metallic nosings for strengthening of e.g. posters in their ends, in which they are to be suspended.

In FIG. 1 is shown a movable device 1 here consisting of a metallic profile such as a stainless steel profile, which has connection to a scissor or pressing device 2, e.g. consisting of a piece of rust-proof metal rail.

The profile 1 and binding rail 2 can be moved bi-directionally in one dimension controlled between two stationary guides 5 and 8, to which is also connected a base 4 and a base support 6 where both base 4 and base support 6 can typically be manufactured from rust-proof steel plates or rails while the guides 5 and 8 can be manufactured from rust-proof steel profiles.

Items which are to be pressed are placed in the space 3 between the base 4 and the binding rail 2 and are pressed when the binding rail 2 is moved in the direction towards the base 4.

Figure 2:
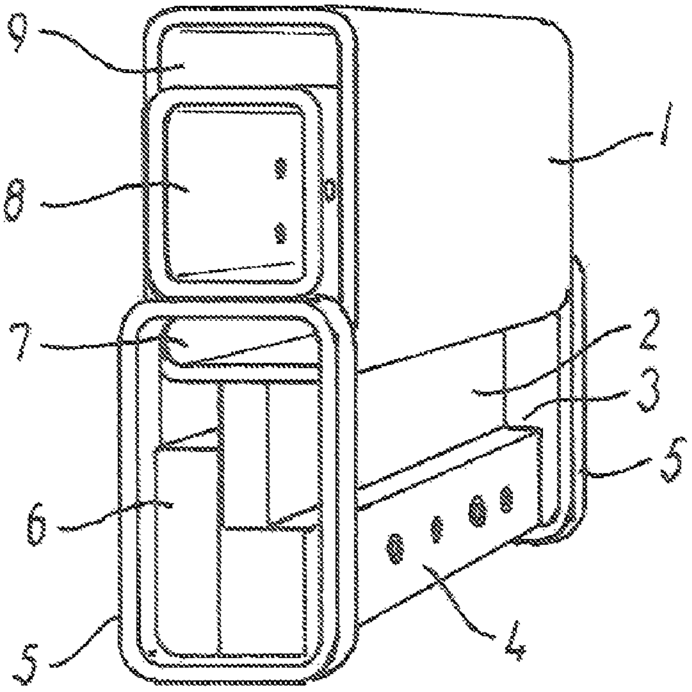
FIG. 2 shows the same device as FIG. 1 but where the pressing mechanism is activated.

In FIG. 1 is shown a simplified diagram of the pressing device with deactivated binding rail 2 where the space 3 is open while FIG. 2 shows the same device with activated binding rail 2 whereby the space 3 is closed.

Figure 3:
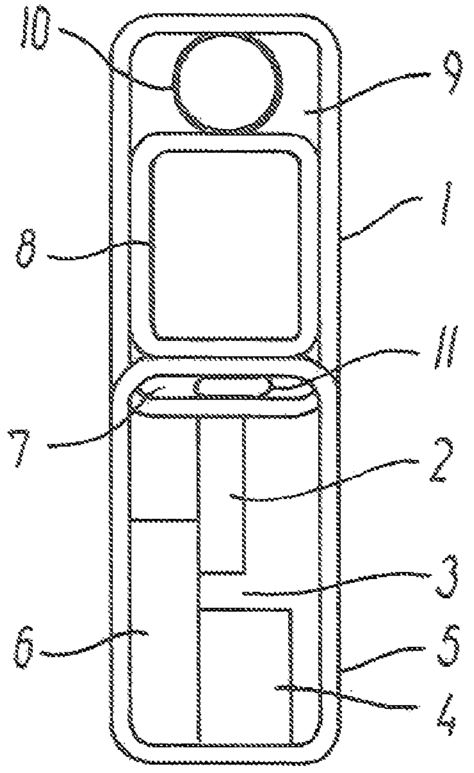
FIG. 3 shows the same device and state as FIG. 1, but seen from an end side and added pressure hoses.

In FIG. 3 is shown the same configuration as in FIG. 1 but seen from an end side where, between the upper stationary guide 8 and the movable profile 1, is placed two flexible elements 10, 11 such as consisting of expandable hoses.

In the example shown in FIG. 3 the upper flexible element 10 is extended and the lower flexible element 11 is minimized, whereby the movable profile 1 is pressed upwards in relation to the stationary guide 8.

In this situation there is thus an open space 3 between the binding rail 2 and base 4.

In FIG. 3, the pressing device is thus deactivated.

Figure 4:
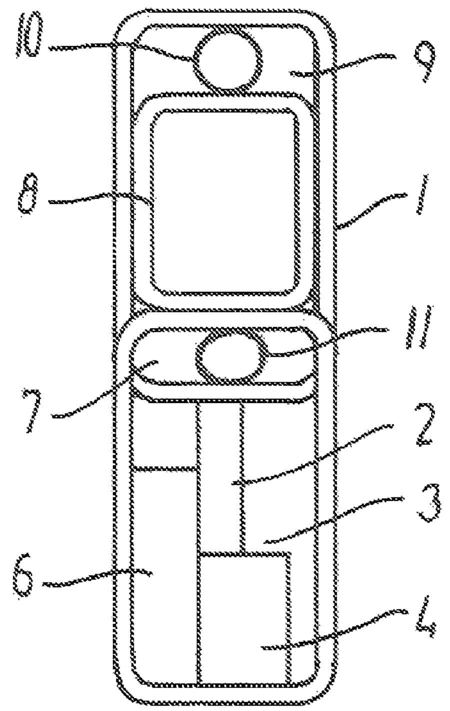
FIG. 4 shows the same device and state as FIG. 2 but seen from an end side and added pressure hoses.

In FIG. 4 is shown the same mechanical configuration as in FIG. 3 but in an activated state where the flexible tube 10 is minimized while the hose 11 is extended.

Hereby the space 3 is removed, indicating that the pressing is complete.

In a preferred embodiment, the flexible elements 10 and 11 are hoses, which can operate under a relatively high pressure, e.g. through application of a gas including air or a liquid including water, which is added to the hoses under pressure.

Since the elements 10 and 11 are flexible, when activated they will enter an extended state and press with an even pressure over the whole surface of the item which is to be pressed.

If the item, which is to be pressed, is manufactured from a magnetic material such as iron, the item can be fixed by building magnets into the surfaces, which outline the space 3 between the binding rail 2 and base 4 including in the contact surfaces of these latter.

Figure 5:
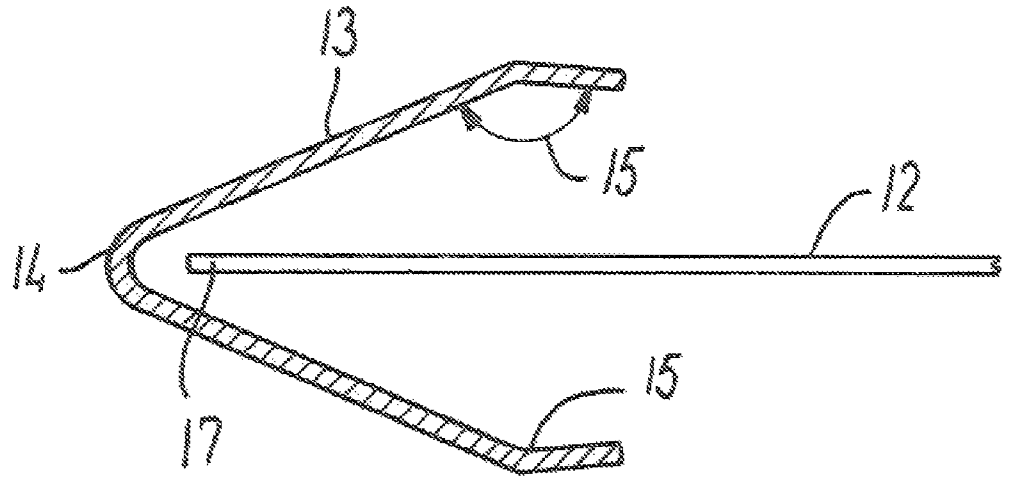
FIG. 5 shows, seen from the side, a poster end, which is to be reinforced by a nosing.

In FIG. 5 is shown an example of items consisting of a rail 13, which is bent 14 around the middle and also provided with angles 15 near the ends.

The rail or bar 13 is manufactured in order to enhance the edge 17 of objects 12 such as posters and/or pictures.

Figure 6:
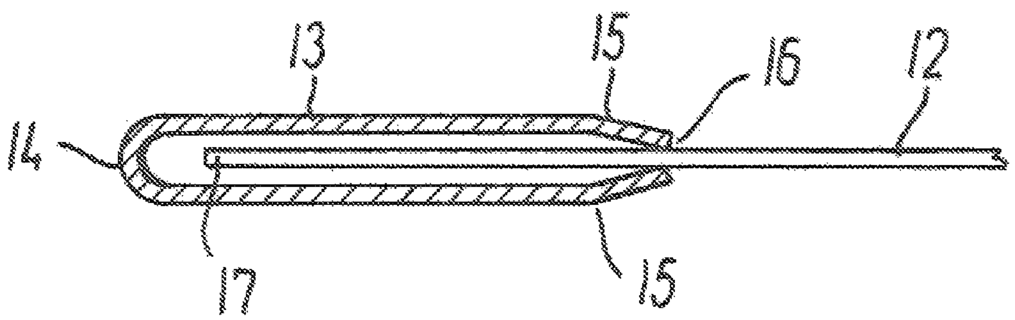
FIG. 6 shows the same configuration as FIG. 5 but with the nosing pressed around the end of the poster.

In FIG. 6 is shown how the bar 13 after pressing in the pressing device is fastened to the object 12 by friction created between the bar ends 16 and the object 12.

The device part of the invention can be manufactured with two or more flexible elements such as hoses, but in a preferred embodiment is used exactly two hoses 10, 11.

The invention claimed is:

1. A device for pressing an item (13) around an end side or edge (17) of an object, the device comprising: a profile (1); a binding rail (2) mounted on an underside of the profile, the profile (1) and the binding rail (2) being movable upwardly and downwardly in relation to first and second stationary mechanical guides (5, 8) which are mounted on each other, the first stationary mechanical guide (8) being placed in the profile (1) such that the first stationary mechanical guide (8) has a lower external side which faces a lower internal side of the profile (1) and an upper external side which faces an upper internal side of the profile (1), two spaces being created between the external sides of the guide (8) and the internal side of the profile (1), an upper space and a lower space, each of these spaces receiving at least one flexible element (10, 11) that is filled and emptied with a fluid, a fixed base mounted to the second stationary mechanical guide (5), the fixed base (4) being parallel with and under the binding rail (2) such that filling the at least one flexible element located in the upper space moves the profile and binding rail upwardly, to form a gap which receives an item and an edge of the object therein, and filling the at least one flexible element in the lower space moves the profile and binding rail downwardly towards the fixed base so as to press the item and fix the item to the edge of the object.

2. The device according to claim 1 wherein the at least one flexible element (10) located in the upper and lower spaces are hoses which are expandable.

3. The device according to claim 1 further comprising one or more magnets, mounted at or integrated in the fixed base (4), for fixing iron-containing items (13), which are to be pressed to the base.

4. The device according to claim 1 wherein the item is a bar bent around a middle thereof to form an open end for receiving the edge of the object therein, the bar having ends which are engageable to the edge of the object after being pressed into contact therewith by the binding rail.

5. The device according to claim 1 wherein the upper flexible element is extended when the lower flexible element is minimized and the upper flexible element is minimized when the lower element is extended.

6. The device according to claim 1 wherein the item is a bar or rail optionally a metallic or magnetic bar or rail.

7. The device of claim 1 wherein the object is a sheet.

8. The device of claim 7 wherein the sheet is a picture or poster, and the item is edging fixed to the edge thereof.

9. A method for pressing an item (13) around an end side or edge (17) of an object, the method comprising: providing a device having: a profile (1); a binding rail (2) mounted on an underside of the profile, the profile (1) and the binding rail (2) being movable upwardly and downwardly in relation to first and second stationary mechanical guides (5, 8) which are mounted on each other, the first stationary mechanical guide (8) being placed in the profile (1) such that the first stationary mechanical guide (8) has a lower external side which faces a lower internal side of the profile (1) and an upper external side which faces an upper internal side of the profile (1), two spaces being created between the external sides of the guide (8) and the internal side of the profile (1), an upper space and a lower space, each of these spaces receiving at least one flexible element (10, 11) that is filled and emptied with a fluid, a fixed base mounted to the second stationary mechanical guide (5), the fixed base (4) being parallel with and under the binding rail (2) such that filling the at least one flexible element located in the upper space moves the profile and binding rail upwardly, to form a gap which receives the item and an edge of the object therein, and filling the at least one flexible element in the lower space moves the profile and binding rail downwardly towards the fixed base so as to press the item and fix the item to the edge of the object; filling the upper flexible element to move the binding rail away from the fixed base to form a gap; placing the item in the gap; placing the edge of the object in the item located within the gap; minimizing the upper flexible element while filling the flexible element in the lower space to move the binding rail into pressing the item to engage the edge of the object to fix the item thereto; expanding the upper flexible element while minimizing the lower flexible element to move the binding rail away from the item fixed to the edge of the object; and, removing the item and object from the gap.

10. The method of claim 9 wherein the item is a bar bent around a middle thereof to form an open end for receiving the edge of the object therein and having a pair of ends which are pressable into contact with the edge of the object.

11. The method according to claim 9 further comprising mounting magnets in the base and wherein the item is an iron-containing item which is held in the gap by the magnets before and after the pressing of the item.

12. The method according to claim 9 wherein the item is a bar or rail.

13. The method according to claim 12 wherein the item is a metallic or magnetic rail.

14. The method according to claim 9 wherein the object is a sheet.

15. The method according to claim 14 wherein the sheet is a poster or picture and the item is edging fixed to the edge thereof.

* * * * *